United States Patent
Patel et al.

(10) Patent No.: US 11,695,628 B2
(45) Date of Patent: *Jul. 4, 2023

(54) TECHNOLOGIES FOR AUTONOMOUS EDGE COMPUTE INSTANCE OPTIMIZATION AND AUTO-HEALING USING LOCAL HARDWARE PLATFORM QOS SERVICES

(71) Applicant: Intel Corporation, Santa Clara, CA (US)

(72) Inventors: Rashmin Patel, Chandler, AZ (US); Monica Kenguva, Phoenix, AZ (US); Francesc Guim Bernat, Barcelona (ES); Edwin Verplanke, Chandler, AZ (US); Andrew J. Herdrich, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/505,262

(22) Filed: Oct. 19, 2021

(65) Prior Publication Data
US 2022/0182284 A1    Jun. 9, 2022

Related U.S. Application Data

(63) Continuation of application No. 16/370,985, filed on Mar. 30, 2019, now Pat. No. 11,171,831.

(51) Int. Cl.
*H04L 41/0816* (2022.01)
*H04L 41/14* (2022.01)
*H04L 67/10* (2022.01)

(52) U.S. Cl.
CPC .......... *H04L 41/0816* (2013.01); *H04L 41/14* (2013.01); *H04L 67/10* (2013.01)

(58) Field of Classification Search
CPC ..... H04L 41/0816; H04L 41/14; H04L 41/40; H04L 41/5003; H04L 41/5009; H04L 41/5025; H04L 67/10; H04L 67/1097
See application file for complete search history.

(56) References Cited

U.S. PATENT DOCUMENTS

| | | |
|---|---|---|
| 11,171,831 B2 | 11/2021 | Patel et al. |
| 2012/0014316 A1* | 1/2012 | Rahman .................. H04L 45/02 370/328 |

(Continued)

OTHER PUBLICATIONS

United States Patent and Trademark Office, "Non-Final Office Action," issued in connection with U.S. Appl. No. 16/370,985, dated Mar. 4, 2020, 17 pages.

(Continued)

*Primary Examiner* — Gil H. Lee
(74) *Attorney, Agent, or Firm* — Hanley, Flight & Zimmerman, LLC

(57) ABSTRACT

Technologies for analyzing and optimizing workloads (e.g., virtual network functions) executing on edge resources are disclosed. According to one embodiment disclosed herein, a compute device launches a virtualized system including a virtual network function and a performance manager, the performance manager to monitor a current resource usage of the virtual network function as a function of a performance profile. The compute device determines, in response to a determination that one or more quality-of-service (QoS) requirements is not satisfied, whether one or more resources from the platform are available for satisfying the QoS requirements. The compute device receives, in response to a determination that the one or more resources are available for satisfying the QoS requirements, the one or more resources and updates the performance profile as a function of the received resources.

18 Claims, 6 Drawing Sheets

(56) References Cited

U.S. PATENT DOCUMENTS

| | | | | |
|---|---|---|---|---|
| 2014/0359114 | A1* | 12/2014 | Takamure | G06F 9/45558 709/224 |
| 2015/0039764 | A1* | 2/2015 | Beloglazov | H04L 47/70 709/226 |
| 2015/0331703 | A1* | 11/2015 | Kelly | G06F 9/45533 718/1 |
| 2016/0196596 | A1* | 7/2016 | Van Wie | H04L 12/1813 705/26.41 |
| 2017/0199752 | A1* | 7/2017 | Cao | G06F 9/45558 |
| 2018/0026904 | A1* | 1/2018 | Van De Groenendaal | G11C 11/56 709/226 |

OTHER PUBLICATIONS

United States Patent and Trademark Office, "Final Office Action," issued in connection with U.S. Appl. No. 16/370,985, dated Jun. 23, 2020, 17 pages.

United States Patent and Trademark Office, "Non-Final Office Action," issued in connection with U.S. Appl. No. 16/370,985, dated Oct. 29, 2020, 13 pages.

United States Patent and Trademark Office, "Final Office Action," issued in connection with U.S. Appl. No. 16/370,985, dated Apr. 1, 2021, 6 pages.

United States Patent and Trademark Office, "Advisory Action," issued in connection with U.S. Appl. No. 16/370,985, dated Jun. 10, 2021, 3 pages.

United States Patent and Trademark Office, "Notice of Allowance and Fee(s) Due," issued in connection with U.S. Appl. No. 16/370,985, dated Jul. 13, 2021, 13 pages.

* cited by examiner

TECHNOLOGIES FOR AUTONOMOUS EDGE COMPUTE INSTANCE OPTIMIZATION AND AUTO-HEALING USING LOCAL HARDWARE PLATFORM QOS SERVICES

CROSS-REFERENCE TO RELATED APPLICATIONS

This patent arises from a continuation of U.S. patent application Ser. No. 16/370,985, filed Mar. 30, 2019, entitled "TECHNOLOGIES FOR AUTONOMOUS EDGE COMPUTE INSTANCE OPTIMIZATION AND AUTO-HEALING USING LOCAL HARDWARE PLATFORM QOS SERVICES." This application is hereby incorporated herein by reference in its entirety.

BACKGROUND

Edge computing provides techniques for processing resources at a location in closer network proximity to a requesting device, as opposed to a centralized location in a cloud network. Doing so ensures that devices receive critical data relatively quickly. Further, an edge network may implement Network Function Virtualization (NFV) atop of edge servers, such as compute devices that execute virtual network functions (VNFs) within virtualized systems (e.g., a virtual machine, container, etc.) launched by the compute devices. Each VNF may perform a given network function to create communication services and the like within the edge network.

Generally, a centralized entity, such as a controller, manages resource monitoring and allocation for VMs executing the VNFs. One concern of using a centralized controller to do so involves increased management traffic in the edge network, particularly as a number of resources (e.g., compute devices executing the VMs) increases. Further, resource management increases compute usage on the centralized controller to provide granular control of a given compute device and the centralized controller is often a single point of failure in the edge network.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
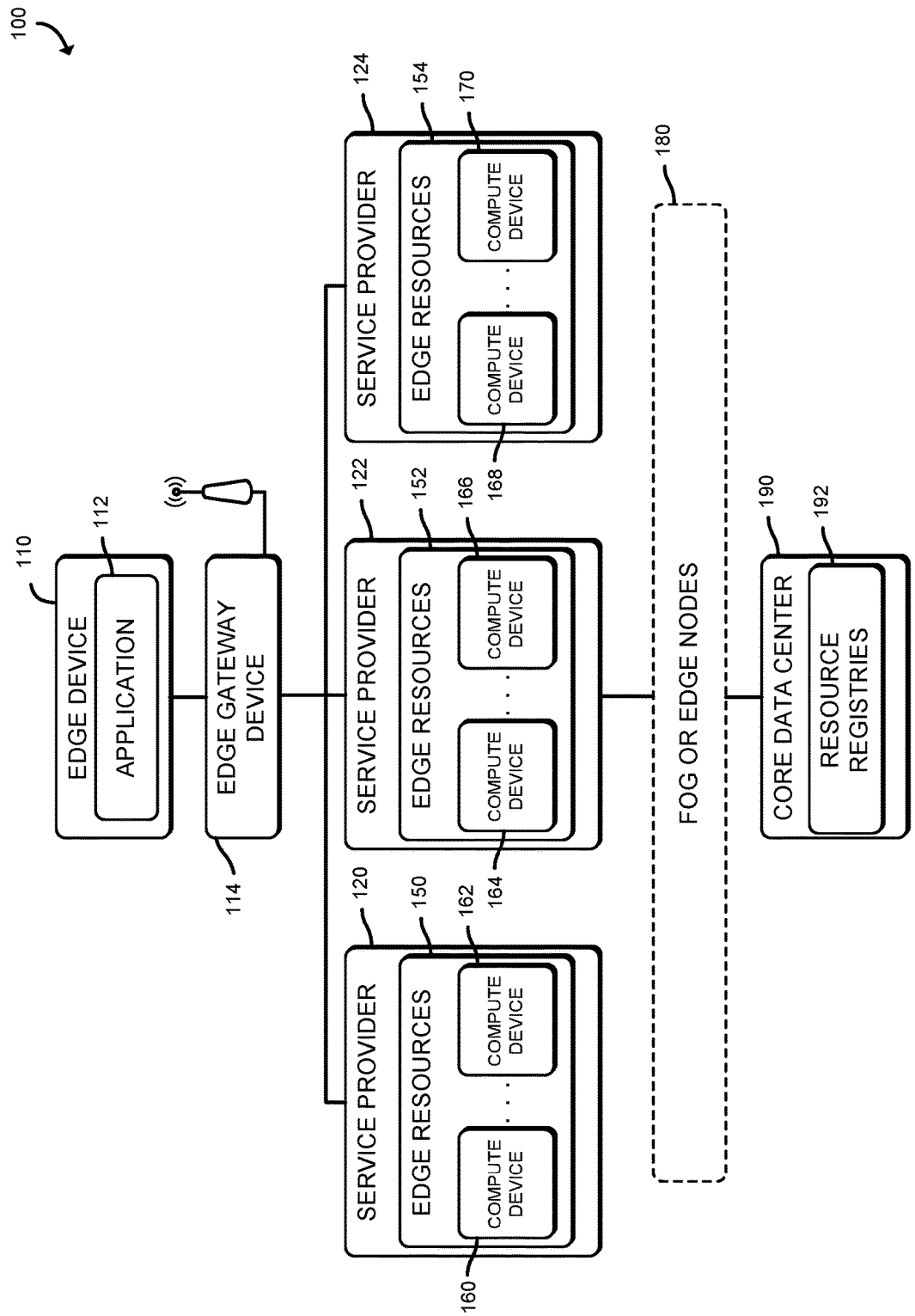
FIG. 1 is a simplified diagram of at least one embodiment of a system for analyzing and optimizing compute instance workloads in an edge platform.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for analyzing and optimizing compute instance workloads for an edge platform is shown. The system 100 is representative of an edge platform. Illustratively, the system 100 includes an edge device 110 in communication with an edge gateway device 114. The edge gateway device 114 may be embodied as any device capable of communicating data between the edge device 110 and one or more edge resources 150, 152, 154 (e.g., resources, such as compute devices and the components thereof, owned and/or operated by one or more service providers 120, 122, 124, respectively, such as cellular network operators) or other compute devices located in a cloud. Further, the edge gateway device 114, in the illustrative embodiment, is configured to receive and respond to requests from the edge device 110 regarding characteristics of the edge resources 150, 152, 154, such as architectures of processors, accelerator devices, and/or other components in the edge resources 150, 152, 154 (e.g., in compute devices 160, 162, 164, 166, 168, 170), latencies, power usage, and costs (e.g., monetary costs) associated with utilizing those edge resources 150, 152, 154. The edge gateway device 114 and the edge resources 150, 152, 154, in the illustrative embodiment, are positioned at one or more locations (e.g., in small cell(s), base station(s), etc.) along the edge (e.g., in an edge network) of a cloud.

An edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. Further, the system 100 may be organized in a hierarchical structure having multiple tiers. For example, a given tier may include the aforementioned edge computing devices, e.g., edge computing devices in locations that are of a similar network proximity to the edge device 110. A next tier may include cell towers and base stations providing edge resources. The following tier may include a central office station in a core data center 190.

It should be appreciated that, in some embodiments, the edge network may form a portion of or otherwise provide an ingress point into a fog network (e.g., fog or edge nodes 180), which may be embodied as a system-level horizontal architecture that distributes resources and services of computing, storage, control and networking anywhere between a core data center 190 (e.g., a data center that is further away from and in a higher level of the hierarchy of the system 100 than the edge resources 150, 152, 154, and that includes multiple compute devices capable of executing one or more services (e.g., processes on behalf of one or more clients)) and an endpoint device (e.g., the edge device 110). Note, the compute devices 160, 162, 164, 166, 168, 170 may be indicative of any device providing resources for the respective edge resources 150, 152, 154, such as compute, acceleration, memory, and storage resources. The core data center 190 may maintain resource registries 192 that list resources provided thereby, such as compute resources, network resources, storage resources, and special purpose resources (e.g., crypto resources, compression resources, accelerator resources used for neural network algorithms, etc.). The resources listed in the resource registries 192 are indicative of autonomous cloud resources that may dynamically be allocated for the edge platform, such as for virtualized instances launched by the compute devices 160, 162, 164, 166, 168, 170.

In an embodiment, the edge device 110 executes an application 112 (e.g., using a processor and/or accelerator device(s)) included therein. The application 112 may include one or more services or workloads for processing. For example, assume that the edge device 110 is representative of an autonomous vehicle connected to the edge network forming the system 100. The application 112 may include various functions for ensuring normal operation of the autonomous vehicle, such as location, navigation, and other functions used to operate the vehicle. Further, the application 112 may request data from services provided by edge resources 150, 152, or 154. Generally, the edge gateway device 114 may receive such requests. The edge gateway device 114 may thereafter evaluate the request and forward the request to an appropriate service at an edge location operated by one of the service providers 120, 122, 124 (or to the fog or edge nodes 180 or core data center 190).

Each service provider 120, 122, 124 may dedicate some of the edge resources to performing network functions via a Network Function Virtualization (NFV) architecture. Particularly, the compute devices 160, 162, 164, 166, 168, 170 may launch a virtualized system, such as a virtual machine or a container, that executes one or more virtual network function (VNF) workloads. Typically, an orchestrator (e.g., a controller device) may coordinate which of the compute devices 160, 162, 164, 166, 168, 170 executes a particular VNF. The orchestrator may determine a suitable compute device based, e.g., on a current usage of each of the compute devices managed by a given service provider. Usage data may be periodically sent by each compute device. Further, in some cases, the orchestrator may rely on various techniques, such as Intel® Resource Director Technology to obtain usage metrics. However, using a centralized controller generally increases network overhead (e.g., due to management traffic) and has issues with scalability.

As further described herein, embodiments disclose techniques for analyzing and optimizing resource usage for the compute devices in the edge platform for the VNFs. In an embodiment, a virtualized system executing a VNF includes a performance manager configured to profile performance and resource usage of the VNF. More particularly, the performance manager may be embodied as a user space thread executing concurrently with the VNF within the virtualized system. The performance manager may monitor resource usage (e.g., via application programming interface (API) hooks connected with platform processes) and determine whether resource usage satisfies policies, e.g., quality of service (QoS) policies, service level agreements, and so on. Based on such determination, the performance manager may request the controller to allocate additional resources or initiate migration of the VNF to another virtualized system. Further, the performance manager may generate one or more profiles associated with the VNF and compute device, such that the profiles may be applied in subsequent deployments of the VNF. Advantageously, by executing a user space thread to manage resources associated with a VNF, embodiments disclosed herein reduce resource management traffic overhead typically experienced by resource controllers. In addition, such an approach provides scalability of virtualized systems within the edge platform to execute VNFs. Further, by relegating a portion of resource management to virtualized systems executing VNFs, this approach reduces the single point of failure concern associated with resource controllers.

Figure 2:
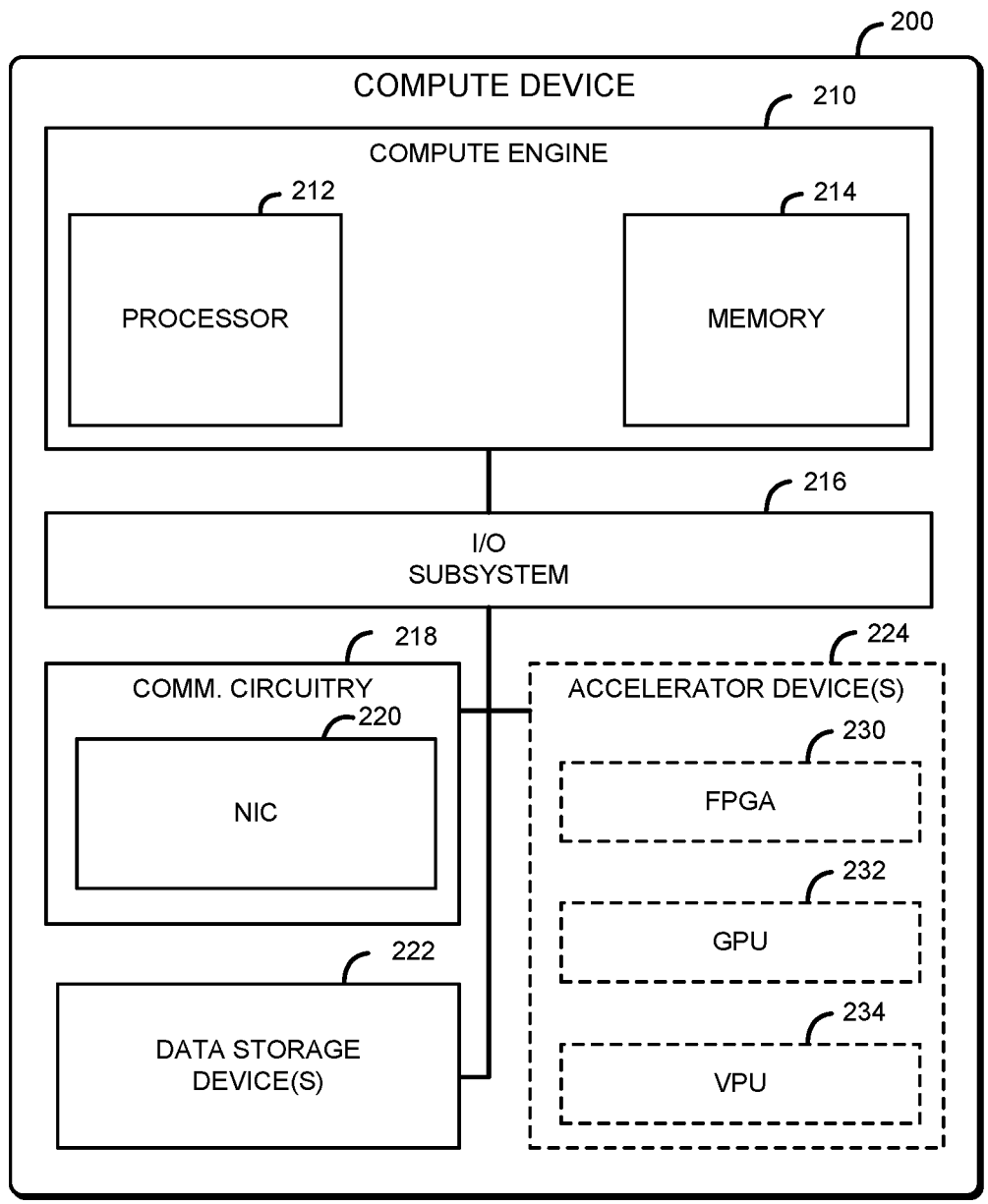
FIG. 2 is a simplified block diagram of at least one embodiment of a compute device that may be included with the system described relative to FIG. 1.

Referring now to FIG. 2, a simplified block diagram of a compute device 200 is shown. The compute device 200 is representative of any of the compute devices 160, 162, 164, 166, 168, 170 described relative to FIG. 1. Further, the compute device 200 may be embodied as one or more physical compute devices or a virtualized system (e.g., one or more functions executed in virtualized environment(s), such as virtual machine(s) or container(s), in which the underlying hardware resources appear as physical hardware to software executing in the virtualized environment(s), but are separated from the software by an abstraction layer). The illustrative compute device 200 includes a compute engine (also referred to herein as "compute engine circuitry") 212, an input/output (I/O) subsystem 216, communication circuitry 218, and one or more data storage devices 222. As described herein, the compute device 200 may also include one or more accelerator devices 224. Of course, in other embodiments, the compute device 200 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212 and a memory 214. The processor 212 may be embodied as any type of processor capable of performing the functions described herein (e.g., executing a virtualized system, such as a virtual machine or container, that includes a virtual network function (VNF) and a performance analyzer and optimizer thread). For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, other specialized hardware, or a virtualized version thereof, etc. to facilitate performance of the functions described herein.

The memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 214 may be integrated into the processor 212. In operation, the memory 214 may store various software and data used during operation such as one or more applications, data operated on by the application(s), libraries, and drivers.

The compute engine 210 is communicatively coupled to other components of the compute device 200 via the I/O subsystem 216, which may be embodied as circuitry and/or components to facilitate input/output operations with the compute engine 210 (e.g., with the processor 212 and/or the memory 214) and other components of the compute device 200. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the memory 214, and other components of the compute device 200, into the compute engine 210.

The communication circuitry 218 may be embodied as any communication circuit, device, or collection thereof, capable of enabling communications over a network between the compute device 200 and another compute device (e.g., the edge device 110, the edge gateway device 114, the edge resources 150, 152, 154, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the edge gateway device 114 to connect with another compute device (e.g., the edge device 110, the edge gateway device 114, the edge resources 150, 152, 154, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the compute device 200 at the board level, socket level, chip level, and/or other levels.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

Each accelerator device(s) 224 may be embodied as any device(s) or circuitries configured to execute a set of operations (e.g., machine learning and artificial intelligence (AI) operations) faster than the processor 212 is capable of executing the operations. The accelerator device(s) 224 may include one or more field programmable gate arrays (FPGAs) 230, each of which may be embodied as a set (e.g., a matrix) of logic gates that can be configured to perform a set of operations according to a defined configuration (e.g., a bit stream). The accelerator device(s) 224 may additionally or alternatively include a graphics processing unit (GPU) 232, which may be embodied as any device or circuitry (e.g., a programmable logic chip, a processor, etc.) configured to perform graphics-related computations (e.g., matrix multiplication, vector operations, etc.). Additionally or alternatively, the accelerator device(s) 224 may include a vision processing unit (VPU) 234, which may be embodied as any device or circuitry (e.g., a programmable logic chip, a processor, etc.) configured to perform operations related to machine vision.

The edge resources 150, 152, 154 (e.g., other compute devices 160, 162, 164, 166, 168, 170), the edge device 110, the edge gateway device 114, the fog nodes 180, and the core data center 190 may have components similar to those described in FIG. 2 with reference to the compute device 200. The description of those components of the compute device 200 is equally applicable to the description of components of the edge resources 150, 152, 154 (e.g., other compute devices 160, 162, 164, 166, 168, 170), the edge device 110, the edge gateway device 114, the fog nodes 180, and the core data center 190. Further, it should be appreciated that any of the edge resources 150, 152, 154 (e.g., other compute devices 160, 162, 164, 166, 168, 170), the edge device 110, the edge gateway device 114, the fog nodes 180, and the core data center 190 may include other components, sub-components, and devices commonly found in a computing device, which are not discussed above in reference to the compute device 200 and not discussed herein for clarity of the description. Further, it should be understood that one or more components of a compute device may be distributed across any distance, and are not necessarily housed in the same physical unit.

The compute device 200, edge gateway device 114, edge resources 150, 152, 154 (e.g., other compute devices 160, 162, 164, 166, 168, 170), the edge device 110, the fog nodes 180, and the core data center 190 are illustratively in communication via a network, which may be embodied as any type of wired or wireless communication network, or hybrids or combinations thereof, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), or any combination thereof.

Figure 3:
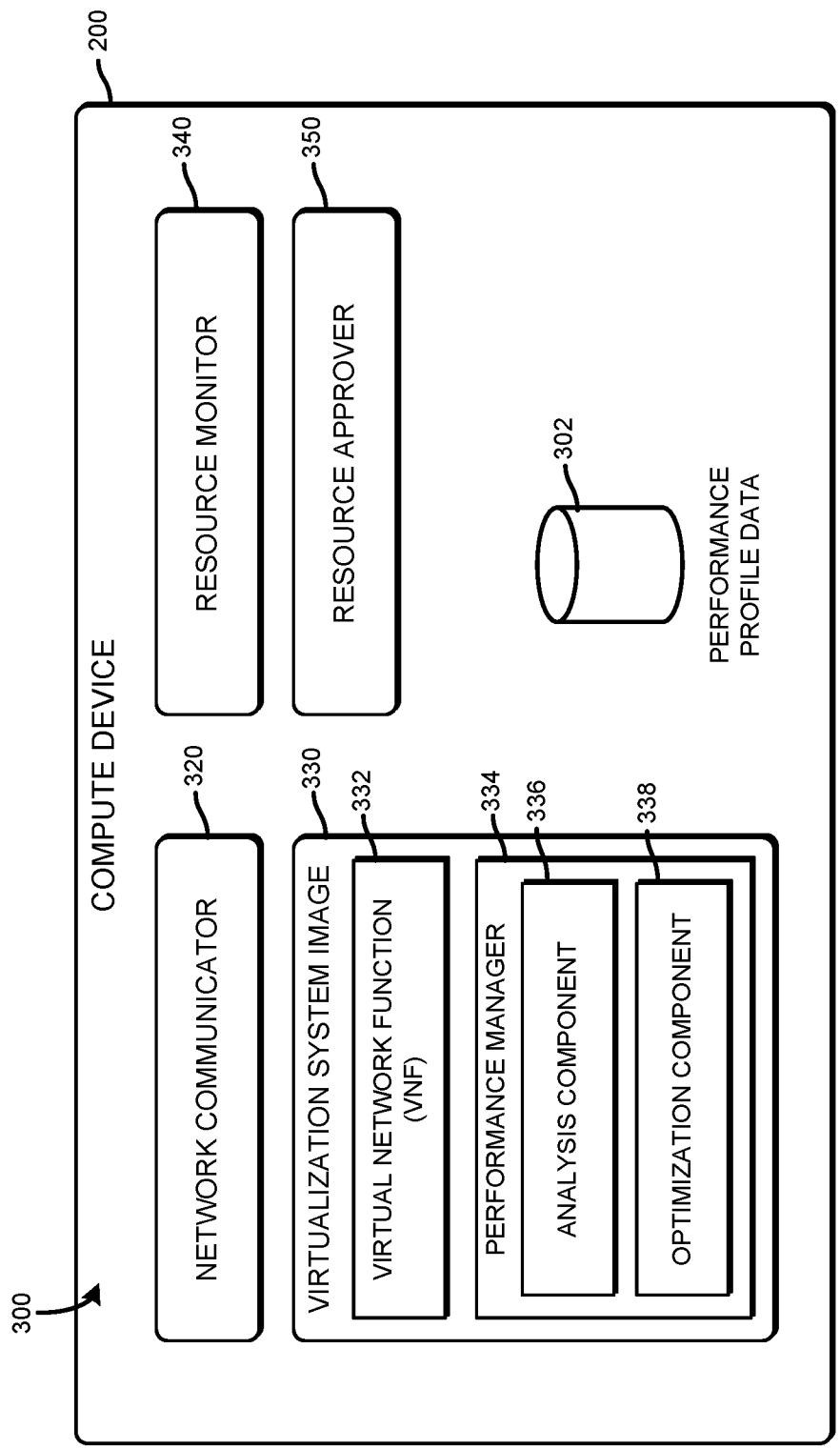
FIG. 3 is a simplified block diagram of at least one embodiment of an environment that may be established by the compute device of FIGS. 1 and 2.

Referring now to FIG. 3, the compute device 200 may establish an environment 300 during operation. The illustrative environment 300 includes a network communicator 320, virtualization system image 330, a resource monitor 340, and a resource approver 350. Each of the components of the environment 300 may be embodied as hardware, firmware, software, or a combination thereof. In some embodiments, one or more of the components of the environment 300 may be embodied as circuitry or a collection of electrical devices (e.g., network communicator circuitry 320, resource monitor circuitry 340, resource approver circuitry 350, etc.).

The environment 300 also includes performance profile data 302, which may be embodied as any data indicative of a resource usage and performance profile associated with a given VNF. The performance profile data 302 may include historical information of resource usage for the given VNF as monitored in the edge platform, e.g., by the performance manager 334. For example, the performance profile data 302 may include, for a given VNF, information relating to a resource usage for cache resources, memory resources, I/O resources, compute resources, crypto resources, accelerator resources, and the like. The performance profile data 302 may also include external information relating to the performance of the edge platform (e.g., relating to incoming network traffic at given times, resource usage on the edge platform as a whole, and the like). The performance manager 334 (or a resources controller) may evaluate the performance profile data 302 to determine an amount of resources to allocate or request for the associated VNF. Further still, the performance profile data 302 may include pre-defined information, such as policies relating to the execution of the VNF (e.g., QoS requirements, SLAs, etc.). The performance profile data 302 may be embodied in various formats, such as a markup language file (e.g., an eXtensible Markup Language (XML) file), a JavaScript Object Notation (JSON) file, a comma separated values (CSV) file, and so on.

In the illustrative embodiment, the network communicator 320, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the devices in the system 100. To do so, the network communicator 320 is configured to receive and process data packets from one system or computing device (e.g., the edge gateway device 114) and to prepare and send data packets to another computing device or system (e.g., other compute devices 160, 162, 164, 166, 168, 170). Accordingly, in some embodiments, at least a portion of the functionality of the network communicator 320 may be performed by the communication circuitry 218, and, in the illustrative embodiment, by the NIC 220.

In the illustrative embodiment, the virtualization system image 330 is an image file for, e.g., a virtual machine (VM), container, or other type of system that may be spawned from a hypervisor configured with the compute device. The virtualization system image 330 may be configured with a given amount of physical resources from the compute device 200 and other sources in the edge platform. Generally, the virtualization system image 330 can be relocated on another compute device 200 as needed. Further, the image 330 includes a VNF 332 and a performance manager 334. The VNF 332 may be embodied as any software implementation of a network function that may be executed by the virtualization system image 330.

The performance manager 334 may be embodied as any program that analyzes monitored resource usage of the VNF 332 and determines a resource allocation based on the observed resource usage. The performance manager 334 may evaluate the monitored resource usage VNF 332 based on performance profile data 302 and any policies associated with the performance of the VNF 332. In an embodiment, the performance manager 334 may be implemented as a thread executing in user space concurrently with the VNF 332 upon launch of the image 330.

The illustrative resource monitor 340 may be embodied as any device or circuitry in the compute device 200 that obtains resource usage metrics within the compute device 200 and from other components of the edge platform. The resource monitor 340 may use platform hooks to other resource monitors in the edge platform (e.g., to Intel® Resource Director Technology resource monitors deployed on edge resources including the compute device 200) to obtain such usage metrics, e.g., cache monitors, memory monitors, I/O monitors, SR-IOV monitors, and the like. The performance manager 334 in turn may receive the usage metrics from the resource monitor 340 to identify available resources in the edge platform.

The illustrative resource approver 350 may be embodied as any device or circuitry in the compute device 200 that processes requests from the performance manager 334 for additional resources to allocate for the VNF 332. The resource approver 350 communicates with the performance manager and resource monitors and allocators within the edge platform to determine whether a request for resource allocation by the performance manager 334 can be serviced. To do so, the resource approver 350 may maintain a table including information associated with a VNF (e.g., identifier, instance identifier, etc.), resource allocation policies, and priority. The resource approver 350 may evaluate the table in response to a request to determine whether to allocate available resources to the performance manager 334. If declined, the performance manager 330 may initiate a migration of the VNF 332 to a compute device that is able to execute the VNF 332 with the requested amount of resources.

Figure 4:
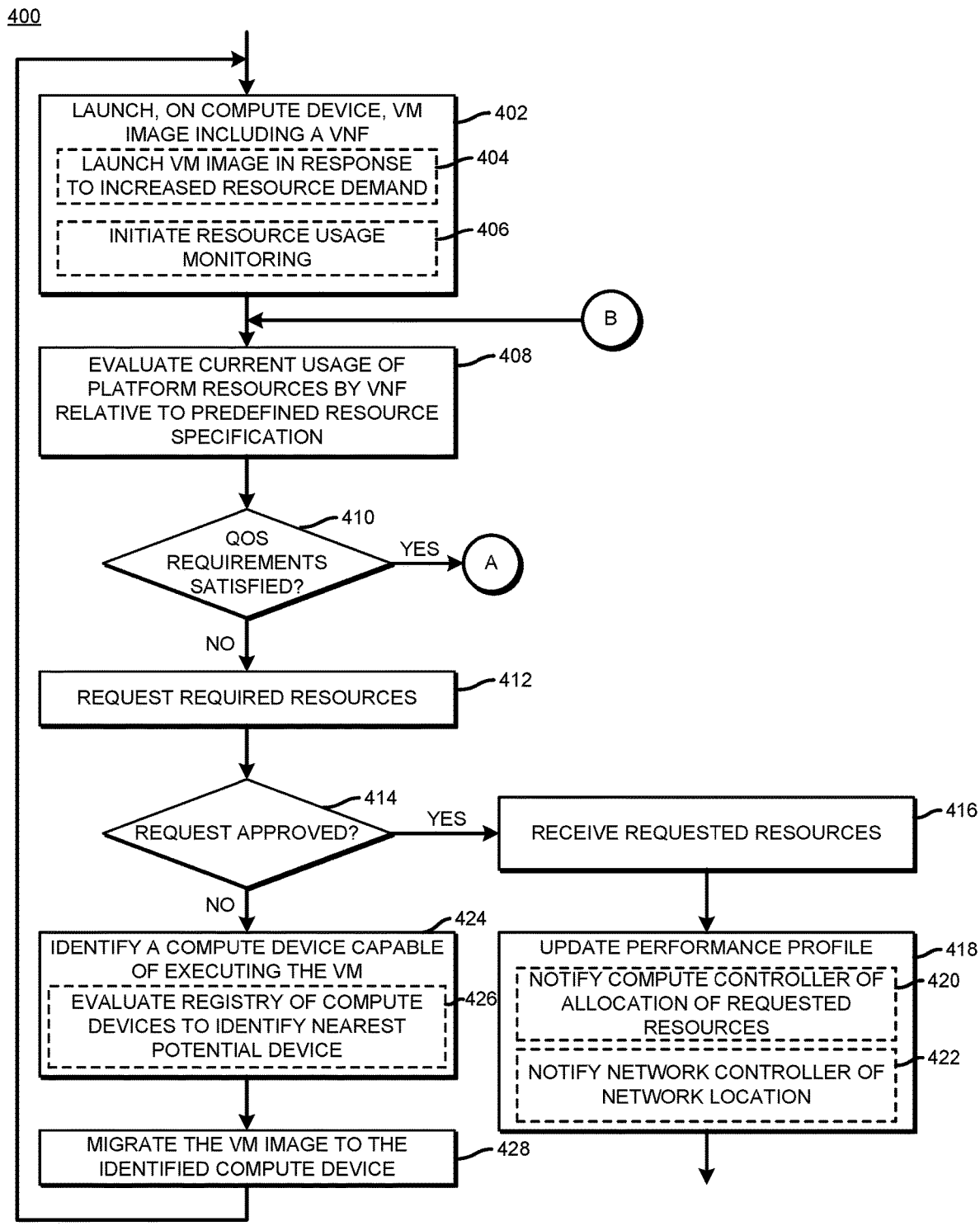
FIGS. 4 and 5 are simplified flow diagrams of at least one embodiment of a method that may be performed by the compute device of FIGS. 1 and 2 for managing edge platform resources.

Referring now to FIG. 4, the compute device 200, in operation, performs a method 400 for analyzing and optimizing compute instance workloads (e.g., a virtualized system executing a VNF). As shown, the method 400 begins in block 402, in which the compute device 402 launches a virtual machine image (e.g., or some other virtualization system image such as a container image) that includes a VNF. For example, in block 404, the compute device 200 does so in response to increased resource demand within the service provider on the edge platform. Further, in block 406, the compute device 200 initiates resource monitoring via the performance manager thread executing within the VM.

In block 408, the compute device 200 (e.g., by the performance manager 334) evaluates a current resource usage of platform resources by the VNF relative to a predefined resource specification. The predefined resource specification is indicative of a preferred amount of resources to be allocated to the VNF to satisfy QoS requirements (or other policies). In block 410, the compute device 200 determines, based on current usage, whether the QoS requirements are satisfied. More particularly, the compute device 200 may determine whether a VNF priority is low (relative to other VNFs executing within edge resources of the service provider in the edge platform) and whether the current usage is greater than or equal to the predefined resource specification. If so, then the method 400 proceeds to steps described relative to FIG. 5. Otherwise, if the VNF priority is high or usage is less than the predefined resource specification, QoS requirements are not met, and the method proceeds to block 412.

Figure 5:
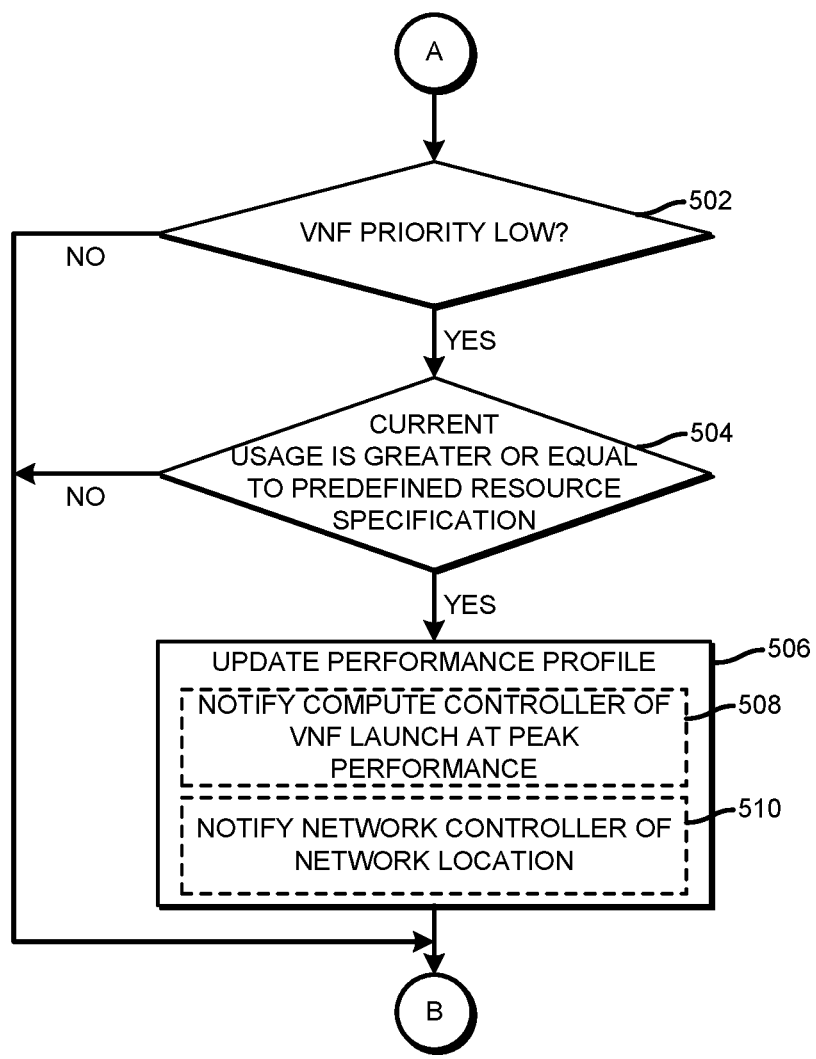

Turning briefly to FIG. 5, in block 502, the compute device 200 (e.g., by the performance manager 334) may determine whether a priority associated with the VNF is low relative to other VNFs executing within edge resources of the service provider in the edge platform. If not, then the method 400 returns to block 408. However, if so, then in block 504, the compute device 200 (e.g., by the performance manager 334) determines whether current usage is greater than or equal to the predefined resource specification. If not, then the method 500 returns to block 408. However, if so, then the compute device 200, via the performance manager 334, updates a performance profile associated with the VNF. For example, to do so, in block 508, the compute device 200 (e.g., by the virtualization system) notifies a compute controller in the edge platform indicating that the VNF is at peak resource performance. In block 510, the compute device 200 notifies the network controller of the network location of the VNF (e.g., by sending a device ID, instance ID, and VNF ID, and network addresses associated with the VNF to the controller).

Referring again to FIG. 4, if QoS requirements are not satisfied, then in block 412, the performance manager 334 may send a request to the resource approver executing in the compute device 200 for required resources to satisfy the QoS requirements. In turn, the resource approver may evaluate a record table which determines a priority of the VNF relative to other VNFs executing in the edge platform and evaluate whether resources are available to be allocated for the VNF. The resource approver may then transmit an approval status (e.g., whether the request was approved or denied) to the performance manager. In block 414, the compute device 200 determines whether the request was approved. If so, then in block 416, the compute device 200 receives the requested resources. More particularly, the compute device 200 may communicate with the controller for the desired resources. In block 418, the compute device 200 (e.g., by the performance manager 334) may update the performance profile associated with the VNF. In addition, in block 420, the compute device 200 notifies a compute controller of the allocation of resources. In block 422, the compute device 200 (e.g., via the virtualization system) notifies the network controller of the network location of the VNF (e.g., by sending a device ID, instance ID, and VNF ID, and network addresses associated with the VNF to the controller).

If the request is not approved, then in block 424, the compute device 200, via the performance manager, identifies a compute device having resources capable of executing the VM having the VNF. To do so, in block 426, the compute device 200 may evaluate a registry of compute devices to identify a compute device in network proximity of the compute device 200 to which to migrate the VM image. In block 428, the compute device 200 migrates the VM image to the identified compute device. The method 400 may return to block 402, in which the subsequent steps are carried out by the identified compute device.

Figure 6:
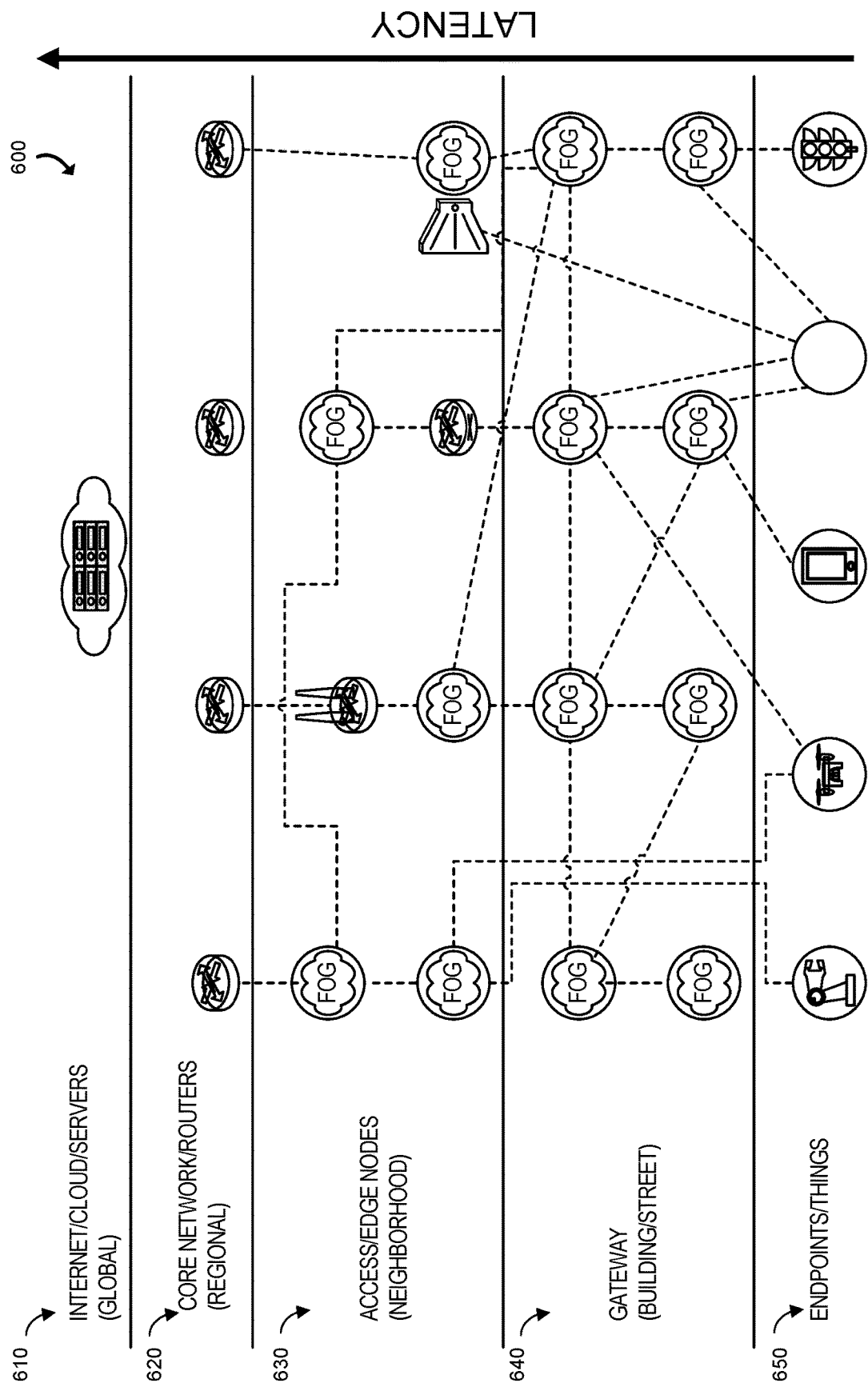
FIG. 6 is a simplified block diagram of a fog and mobile edge computing (MEC) network topology that may be utilized with the system of FIG. 1.

Referring briefly to FIG. 6, a MEC and fog network topology 600 is shown. The network topology 600 includes endpoints (at an endpoints/things network layer 650), gateways (at a gateway layer 640), access or edge computing nodes (e.g., at neighborhood nodes layer 630), core network or routers (e.g., at a regional or central office layer 620). A fog network (e.g., established at the gateway layer 640) may represent a dense geographical distribution of near-user edge devices (e.g., fog nodes), equipped with storage capabilities (e.g., to avoid the need to store data in cloud data centers), communication capabilities (e.g., rather than routed over an internet backbone), control capabilities, configuration capabilities, measurement and management capabilities (rather than controlled primarily by network gateways such as those in an LTE or 5G core network), among others. In this context, FIG. 6 illustrates a general architecture that integrates a number of MEC and fog nodes—categorized in different layers (based on their position, connectivity and processing capabilities, etc.). It will be understood, however, that such fog nodes may be replaced or augmented by edge computing processing nodes.

Fog nodes may be categorized depending on the topology and the layer where they are located. In contrast, from a MEC standard perspective, each fog node may be considered as a mobile edge (ME) Host, or a simple entity hosting a ME app and a light-weighted ME Platform. In an example, a MEC or fog node may be defined as an application instance, connected to or running on a device (ME Host) that is hosting a ME Platform. As such, the application may consume MEC services and be associated to a ME Host in the system. The nodes may be migrated, associated to different ME Hosts, or consume MEC services from other (e.g., local or remote) ME platforms.

In contrast to using the edge, as described above, a traditional application may rely on remote cloud data storage and processing to exchange and coordinate information. A cloud data arrangement allows for long-term data collection and storage, but is not optimal for highly time varying data and may fail in attempting to meet latency challenges (e.g., stopping a vehicle when a child runs into the street). The use of the edge resources as described above enable providing services (e.g., execution of functions) in a low-latency manner, and, in some embodiments, may utilize features in existing MEC services that provide minimal overhead.

In addition to the MEC implementation described above, it should be appreciated that the foregoing systems and methods may implemented in any environment (e.g., smart factories, smart cities, smart buildings, and the like) in which the devices are arranged and interoperate in a manner similar to that described with reference to FIG. 1, though the names of the individual devices may differ from one implementation to the next. For example, in a smart factory, the above systems and methods may improve the accuracy, efficiency, and/or safety with which one or more manufacturing operations are performed, particularly in instances in which the operations are to be performed in real time or near real time (e.g., in which low latency is of high importance). In a smart city, the above systems and methods may improve the accuracy, efficiency, and/or safety in the operation of traffic control systems, environmental monitoring systems, and/or other automated or semi-automated systems. Likewise, in a smart building, the above disclosure may applied to improve the operations of any systems that rely on sensors to collect and act upon the collected information (e.g., threat detection and evacuation management systems, video monitoring systems, elevator control systems, etc.).

EXAMPLES

Illustrative examples of the technologies disclosed herein are provided below. An embodiment of the technologies may include any one or more, and any combination of, the examples described below.

Example 1 includes a compute device of a plurality of compute devices in an edge network platform, the compute device comprising circuitry to launch a virtualized system including a virtual network function and a performance manager, the performance manager to monitor a current resource usage of the virtual network function as a function of a performance profile; determine, in response to a determination that one or more quality-of-service (QoS) requirements is not satisfied, whether one or more resources from the platform are available for satisfying the QoS requirements; receive, in response to a determination that the one or more resources are available for satisfying the QoS requirements, the one or more resources; and update the performance profile as a function of the received resources.

Example 2 includes the subject matter of Example 1, and wherein the circuitry is further to, in response to a determination that the one or more resources are not available, identify a second compute device of the plurality of compute devices having resources available to execute the virtualized system.

Example 3 includes the subject matter of any of Examples 1 and 2, and wherein the circuitry is further to migrate the virtualized system to the identified compute device.

Example 4 includes the subject matter of any of Examples 1-3, and wherein to identify the second compute device comprises to evaluate a registry of compute devices of the plurality of compute devices to identify one of the plurality of compute devices having a network proximity to the compute device.

Example 5 includes the subject matter of any of Examples 1-4, and wherein to launch the virtualized system comprises to launch the virtualized system based on an increase in resource demand.

Example 6 includes the subject matter of any of Examples 1-5, and wherein the circuitry further comprises to initiate resource usage monitoring within the virtualized system by the performance manager.

Example 7 includes the subject matter of any of Examples 1-6, and wherein the circuitry is further to request the one or more resources from the platform.

Example 8 includes the subject matter of any of Examples 1-7, and wherein to determine whether one or more resources from the platform are available for satisfying the QoS requirements comprises to query one or more resource controllers to determine an availability of resources associated with the respective resource controller.

Example 9 includes the subject matter of any of Examples 1-8, and wherein to update the performance profile comprises to notify one or more resource controllers of at least one of the current resource usage of the virtual network function or a network location of the compute device.

Example 10 includes the subject matter of any of Examples 1-9, and wherein to update the performance profile further comprises to notify one or more resource controllers of a network location of the compute device.

Example 11 includes one or more machine-readable storage media storing instructions, which, when executed on one or more processors, causes a compute device to launch a virtualized system including a virtual network function and a performance manager, the performance manager to monitor a current resource usage of the virtual network function as a function of a performance profile; determine, in response to a determination that one or more quality-of-service (QoS) requirements is not satisfied, whether one or more resources from the platform are available for satisfying the QoS requirements; receive, in response to a determination that the one or more resources are available for satisfying the QoS requirements, the one or more resources; and update the performance profile as a function of the received resources.

Example 12 includes the subject matter of Example 11, and wherein the instructions further cause the compute device to, in response to a determination that the one or more resources are not available, identify a second compute device of the plurality of compute devices having resources available to execute the virtualized system.

Example 13 includes the subject matter of any of Examples 11 and 12, and wherein the instructions further cause the compute device to migrate the virtualized system to the identified compute device.

Example 14 includes the subject matter of any of Examples 11-13, and wherein to identify the second compute device comprises to evaluate a registry of compute devices of the plurality of compute devices to identify one of the plurality of compute devices having a network proximity to the compute device.

Example 15 includes the subject matter of any of Examples 11-14, and wherein to launch the virtualized system comprises to launch the virtualized system based on an increase in resource demand.

Example 16 includes the subject matter of any of Examples 11-15, and wherein the instructions further cause the compute device to initiate resource usage monitoring within the virtualized system by the performance manager.

Example 17 includes the subject matter of any of Examples 11-16, and wherein the instructions further cause the compute device to request the one or more resources from the platform.

Example 18 includes the subject matter of any of Examples 11-17, and wherein to determine whether one or more resources from the platform are available for satisfying the QoS requirements comprises to query one or more resource controllers to determine an availability of resources associated with the respective resource controller.

Example 19 includes the subject matter of any of Examples 11-18, and wherein to update the performance profile comprises to notify one or more resource controllers of at least one of the current resource usage of the virtual network function or a network location of the compute device.

Example 20 includes a compute device comprising means for launching a virtualized system including a virtual network function and a performance manager, the performance manager to monitor a current resource usage of the virtual network function as a function of a performance profile; means for determining, in response to a determination that one or more quality-of-service (QoS) requirements is not satisfied, whether one or more resources from the platform are available for satisfying the QoS requirements; means for receiving, in response to a determination that the one or more resources are available for satisfying the QoS requirements, the one or more resources; and means for updating the performance profile as a function of the received resources.

What is claimed is:

1. An apparatus comprising:
   at least one memory;
   machine readable instructions; and
   processor circuitry to execute the machine readable instructions to at least:
   launch a user space thread to monitor resource usage of a virtual network function (VNF) and execute concurrently with the VNF;
   generate a performance profile based on information provided by the user space thread, the information including timestamped network traffic data;
   update the performance profile in response to a request for resources to satisfy a quality of service condition associated with the VNF;
   determine whether the request for resources can be satisfied based on an evaluation of:
   the updated performance profile;
   a registry of compute devices available for resource migration; and
   a table of information associated with the VNF including an instance identifier, a resource allocation policy, and a priority; and
   transmit the instance identifier to a network controller.

2. The apparatus of claim 1, wherein the VNF is a first VNF and the priority is a first priority associated with the first VNF, and wherein the processor circuitry is to execute the machine readable instructions to compare the first priority of the first VNF to a second priority of a second VNF that is identified based on the registry of compute devices.

3. The apparatus of claim 1, wherein the processor circuitry is to execute the machine readable instructions to cause the user space thread to monitor a cache usage associated with the VNF.

4. The apparatus of claim 1, wherein the processor circuitry is to execute the machine readable instructions to maintain a database of information including a quality of service requirement and a historical resource usage associated with the VNF.

5. The apparatus of claim 1, wherein the performance profile is stored in a markup language file and applied to a subsequent deployment of the VNF.

6. The apparatus of claim 1, wherein the processor circuitry is to execute the machine readable instructions to:
   launch the VNF in a virtualized system; and
   retrieve information based on an application programming interface associated with a platform process.

7. The apparatus of claim 1, wherein the processor circuitry is to execute the machine readable instructions to send the instance identifier and a network address associated with the VNF to a network controller.

8. A computer readable storage device or storage disk having instructions stored therein that, in response to being executed on processor circuitry, cause the processor circuitry to:
- launch a user space thread to monitor resource usage of a virtual network function (VNF) and execute concurrently with the VNF;
- generate a performance profile based on information provided by the user space thread, the information including timestamped network traffic data;
- update the performance profile in response to a request for resources to satisfy a quality of service condition associated with the VNF;
- determine whether the request for resources can be satisfied based on an evaluation of:
  - the updated performance profile;
  - a registry of compute devices available for resource migration; and
  - a table of information associated with the VNF including an instance identifier, a resource allocation policy, and a priority; and
- transmit the instance identifier to a network controller.

9. The computer readable storage device or storage disk of claim 8, wherein the VNF is a first VNF and the priority is a first priority associated with the first VNF, and the instructions, when executed, cause the processor circuitry to compare the first priority of the first VNF to a second priority of a second VNF that is identified based on the registry of compute devices.

10. The computer readable storage device or storage disk of claim 8, wherein the instructions, when executed, cause the processor circuitry to monitor a cache usage associated with the VNF.

11. The computer readable storage device or storage disk of claim 8, wherein the instructions, when executed, cause the processor circuitry to maintain a database of information including a quality of service requirement and a historical resource usage associated with the VNF.

12. The computer readable storage device or storage disk of claim 8, wherein the performance profile is stored in a markup language file and applied to a subsequent deployment of the VNF.

13. The computer readable storage device or storage disk of claim 8, wherein the instructions, when executed, cause the processor circuitry to:
- launch the VNF in a virtualized system; and
- retrieve information based on an application programming interface associated with a platform process.

14. The computer readable storage device or storage disk of claim 8, wherein the instructions, when executed, cause the processor circuitry to send the instance identifier and a network address associated with the VNF to a network controller.

15. A method comprising:
- launching a user space thread to monitor resource usage of a virtual network function (VNF) and execute concurrently with the VNF;
- generating a performance profile based on information provided by the user space thread, the information including timestamped network traffic data;
- updating the performance profile in response to a request for resources to satisfy a quality of service condition associated with the VNF;
- determining whether the request for resources can be satisfied based on an evaluation of:
  - the updated performance profile;
  - a registry of compute devices available for resource migration; and
  - a table of information associated with the VNF including an instance identifier, a resource allocation policy, and a priority; and
- transmitting the instance identifier to a network controller.

16. The method of claim 15, wherein the VNF is a first VNF and the priority is a first priority, further including comparing the first priority of the first VNF to a second priority of a second VNF that is identified based on the registry of compute devices.

17. The method of claim 15, further including:
- causing the user space thread to monitor a cache usage associated with the VNF; and
- maintaining a database of information associated with the VNF, the database including the performance profile stored in a markup language file.

18. The method of claim 15, further including:
- launching the VNF in a virtualized system;
- retrieving information associated with the VNF from an application programming interface associated with a platform process; and
- sending an instance identifier and a network address associated with the VNF to a network controller.

* * * * *